United States Patent
Zhang et al.

(10) Patent No.: US 11,939,501 B2
(45) Date of Patent: Mar. 26, 2024

(54) ANTIMICROBIAL REINFORCED FLOOR AND METHOD FOR PREPARING SAME

(71) Applicant: CHANGZHOU BEMATE HOME TECHNOLOGY CO., LTD., Jiangsu (CN)

(72) Inventors: Xiaoling Zhang, Jiangsu (CN); Zhiyuan Xiao, Jiangsu (CN); Yanhui Li, Jiangsu (CN); Min Kang, Jiangsu (CN); Junxiang Dong, Jiangsu (CN)

(73) Assignee: CHANGZHOU BEMATE HOME TECHNOLOGY CO., LTD., Changzhou (CN)

( * ) Notice: Subject to any disclaimer, the term of this patent is extended or adjusted under 35 U.S.C. 154(b) by 148 days.

(21) Appl. No.: 17/477,698

(22) Filed: Sep. 17, 2021

(65) Prior Publication Data

US 2022/0002593 A1 Jan. 6, 2022

(30) Foreign Application Priority Data

Mar. 19, 2021 (CN) .......................... 202110296486.8

(51) Int. Cl.
*C09J 7/35* (2018.01)
*A01N 25/34* (2006.01)
*A01N 43/40* (2006.01)
*A01N 55/02* (2006.01)
*A01N 59/16* (2006.01)
*C09J 7/21* (2018.01)
*C09J 11/04* (2006.01)
*C09J 11/06* (2006.01)

(52) U.S. Cl.
CPC ................ *C09J 7/35* (2018.01); *A01N 25/34* (2013.01); *A01N 43/40* (2013.01); *A01N 55/02* (2013.01); *A01N 59/16* (2013.01); *C09J 7/21* (2018.01); *C09J 11/04* (2013.01); *C09J 11/06* (2013.01); *C09J 2301/304* (2020.08); *C09J 2301/408* (2020.08); *C09J 2400/283* (2013.01); *C09J 2461/00* (2013.01)

(58) Field of Classification Search
CPC ....... C09J 7/35; C09J 7/21; C09J 11/04; C09J 11/06; C09J 2301/408; C09J 2301/304; C09J 2400/283; C09J 2461/00; A01N 25/34; A01N 43/40; A01N 55/02; A01N 59/16

See application file for complete search history.

(56) References Cited

U.S. PATENT DOCUMENTS 6,248,342 B1 6/2001 Trogolo et al.
2010/0233326 A1 9/2010 Nakagawa et al.

FOREIGN PATENT DOCUMENTS

CN 111576786 A 8/2020

OTHER PUBLICATIONS

Machine translation of CN 106739317 B; Shen Jianxin; Publication date: Jan. 5, 2018.*
Machine translation of CN 111576786 A; Gong Hongxia; Publication date: Aug. 25, 2020.*
Machine translation of JP 2011524337 A; Venkatalan Krishnan; Publication date: Jan. 9, 2011.*

* cited by examiner

*Primary Examiner* — Vishal I Patel

(57) ABSTRACT

Disclosed herein are an antimicrobial reinforced floor and a method for preparing the same. In the method, a substrate and an impregnated paper impregnated with an inorganic antimicrobial agent and an organic antimicrobial agent are subjected to hot press forming to produce the antimicrobial reinforced floor.

12 Claims, No Drawings

ANTIMICROBIAL REINFORCED FLOOR AND METHOD FOR PREPARING SAME

CROSS-REFERENCE TO RELATED APPLICATIONS

This application claims the benefit of priority from Chinese Patent Application No. 202110296486.8, filed on Mar. 19, 2021. The content of the aforementioned application, including any intervening amendments thereto, is incorporated herein by reference in its entirety.

TECHNICAL FIELD

This application relates to floors, and more particularly to an antimicrobial reinforced floor and a method for preparing the same.

BACKGROUND

At present, inorganic antimicrobial agents, such as silver-based, copper-based, zinc-based and titanium-based antimicrobial agents, have been widely applied to the antimicrobial floors. These antimicrobial agents have good safety, and excellent heat resistance and durability, but they cannot provide a desirable antimicrobial effect and have low cost effectiveness. The inorganic antimicrobial agent exhibits delayed antimicrobial effect, and cannot kill bacteria quickly. In addition, the inorganic antimicrobial agent is hardly effective fungi and molds.

Furthermore, most of the existing antimicrobial floors are produced by spraying an antimicrobial coating, which increases the production complexity and largely influences the production environment. In addition, in actual use, the surface antimicrobial coating is prone to damage and failure.

Therefore, an antimicrobial reinforced floor and a method for preparing the same are provided herein.

SUMMARY

An objective of the present disclosure is to provide an antimicrobial reinforced floor and a method for preparing the same, so as to prepare an antibacterial floor with excellent antibacterial and antifungal properties, good heat resistance and durability.

The technical solutions of the present disclosure are described as follow.

In a first aspect, the present disclosure provides a method for preparing an antimicrobial reinforced floor, which comprises:

subjecting a substrate and an impregnated paper impregnated with an inorganic antimicrobial agent and an organic antimicrobial agent to hot press forming.

In a second aspect, the present disclosure provides an antimicrobial reinforced floor prepared by the method mentioned above.

The beneficial effects of the present disclosure are described as follows.

A method for preparing an antimicrobial reinforced floor is provided, in which an organic antimicrobial agent and an inorganic antimicrobial agent are introduced into an impregnated paper, and subjected to hot press forming with a substrate. Compared to the traditional surface spraying process, the method provided herein simplifies the production process, and the antimicrobial agents are not easy to lose their effects. The antimicrobial reinforced floor prepared by this method is antifungal as well as antibacterial, and has good durability and high effectiveness.

DETAILED DESCRIPTION OF EMBODIMENTS

The objectives, technical solutions and beneficial effects of the present disclosure will be described clearly and completely below with reference to the embodiments. Unless otherwise specified, the operations are performed in accordance with the conventional conditions or the conditions recommended by the manufacturer, and the reagents or instruments are all commercially available.

A method for preparing an antimicrobial reinforced floor is provided, in which an organic antimicrobial agent and an inorganic antimicrobial agent are creatively added into an impregnating adhesive. An optimized feeding process solves the compatibility of the organic antimicrobial agent and the dispersion and sedimentation of the inorganic antimicrobial agent. This creative method does not add the production processes, but can prepared an antimicrobial reinforced floor being antifungal as well as antibacterial and having good durability and effective antibacterial effect.

The method for preparing an antimicrobial reinforced floor includes the following steps.

S1 Preparation of a composite antibacterial impregnating adhesive

An organic antimicrobial agent and an inorganic antimicrobial agent are introduced into an impregnating adhesive to obtain the composite antibacterial impregnating adhesive. Specifically, the composite antibacterial impregnating adhesive can be prepared by mixing the organic antimicrobial agent, the inorganic antimicrobial agent and a raw impregnating adhesive. The raw impregnating adhesive is not limited, and can be a common adhesive used for bonding each layer of the floor. In some embodiments, the raw impregnating adhesive is an adhesive prepared by a reaction of formaldehyde and melamine, in which the formaldehyde and the melamine react through addition and polycondensation.

The organic antimicrobial agent is creatively added during the preparation of the impregnating adhesive. Specifically, after the reaction for preparing the raw impregnating adhesive, the organic antimicrobial agent is added into the raw impregnating adhesive to obtain a homogeneous and compatible composite glue, solving the undesirable compatibility of the organic antimicrobial agent when being directly added. An addition of zinc oxide improves high temperature resistance of the antibacterial impregnating adhesive and ensures the stability of the organic antimicrobial agent during the high-temperature hot press forming.

In some embodiments, the raw impregnating adhesive is prepared as follows. A pH value of an aqueous formaldehyde solution is adjusted to 8-9, and the aqueous formaldehyde solution is then mixed with melamine and reacts for 20-30 min to obtain a reacted solution. A pH value of the reacted solution is adjusted to 8-8.5, and then the reacted solution is heated to 95-100° C. and reacts for 60-90 min. During the reaction process, the pH of the reaction needs to be precisely controlled so that the melamine maintains good reactivity.

Preferably, a stabilizer is added when the aqueous formaldehyde solution and melamine are reacted. More preferably, the stabilizer is diethylene glycol. By introducing the stabilizer, the stability of the prepared adhesive is better, which is beneficial to further extend the service life of the floor.

Preferably, after the aqueous formaldehyde solution and the melamine are reacted for 20-30 min and heated to 70-80°

C., an aldehyde removal agent is added to the reacted solution, and then the pH of the reacted solution is adjusted to 8-8.5. The heating process is slowly performed. The addition of the aldehyde removal agent reduces the formaldehyde content in the adhesive to meet the requirements of environmental protection. The composition of the aldehyde removal agent is not limited, and the aldehyde removal agent can be, for example, ethylene urea, chitin, a biological enzyme aldehyde remover and a photocatalyst aldehyde remover.

Preferably, the composite antibacterial impregnating adhesive is prepared by the following steps. The raw impregnating adhesive and the organic antimicrobial agent are mixed at 50-60° C. for 20-30 min to obtain an organic antibacterial impregnating adhesive, and the organic antibacterial impregnating adhesive is mixed with the inorganic antimicrobial agent after the organic antibacterial impregnating adhesive is cooled to room temperature. By optimizing the mixing steps and mixing temperature of the raw impregnating adhesive, the organic antimicrobial agent and the inorganic antimicrobial agent, the organic antimicrobial agent can maintain good activity. If the temperature is too low, the activity of the organic antimicrobial agent is not enough, and the antibacterial performance of the prepared floor is not ideal; and if the temperature is too high, the organic antimicrobial agent is prone to failure.

Further, a weight ratio of the organic antimicrobial agent to the raw impregnating adhesive is (0.5-3.3):100; and a weight ratio of the inorganic antimicrobial agent to the raw impregnating adhesive is (0.5-5):100. By controlling the addition amount of the organic antimicrobial agent and the inorganic antimicrobial agent, the antibacterial effect of the floor is further ensured. If the addition amount is too small, the antibacterial effect is not ideal; and if the addition amount is too large, the antimicrobial agents will not be easy to disperse, and cannot be added into the impregnating adhesive.

Generally, organic antimicrobial agents can to quickly kill bacteria, and can also inhibit and kill fungi and molds. However, the heat resistance of organic antimicrobial agents is not as good as that of inorganic antimicrobial agents, and the durability of organic antimicrobial agents is less preferable than that of inorganic antimicrobial agents. Currently, the organic antimicrobial agent is seldomly used in floor industry. Both the organic antimicrobial agent and the inorganic antimicrobial agent are creatively added into the impregnating adhesive herein. The two antimicrobial agents are introduced when each layer of the floor is impregnated with the impregnating adhesive, such that spraying is no longer need, reducing the production process.

Further, the organic antimicrobial agent is selected from the group consisting of a quaternary ammonium salt, a phenolic compound, a biguanide compound, an isothiazole compound, a pyrrole compound, an organometallic compound, an imidazole compound, a pyridine compound and a combination thereof. Preferably, the organic antimicrobial agent is a pyridine compound, and more preferably, the organic antimicrobial agent is zinc pyrithione. The organic antimicrobial agents mentioned above are preferred organic antimicrobial agents, and general types of organic antimicrobial agents are within the scope of the present disclosure. The zinc pyrithione can better cooperate with the inorganic antimicrobial agent to prepare a floor with better comprehensive antibacterial properties.

Further, the inorganic antimicrobial agent is selected from the group consisting of nano silver, nano copper, nano titanium dioxide, nano zinc oxide and a combination thereof. Preferably, the inorganic antimicrobial agent is nano zinc oxide, and more preferably, the inorganic antimicrobial agent is a modified nano zinc oxide with a particle size of 100-500 nm. The inorganic antimicrobial agents mentioned above are preferred inorganic antimicrobial agents, and general types of inorganic antimicrobial agents are within the scope of the present disclosure. The zinc pyrithione can better cooperate with the organic antimicrobial agent to prepare a floor with better comprehensive antibacterial properties. In addition, nano zinc oxide has low cost and can meet environmental protection requirements. Nano silver oxide has been restricted by the United States and other regions, and nano copper and nano titanium dioxide are relatively expensive.

Specifically, the modified nano zinc oxide is commercially available, and the modification method includes ion doping, precious metal surface deposition, surface photosensitization, semiconductor recombination and ion implantation. For example, the modified nano zinc oxide is prepared by doping metal ions, such as Ag, Al and Fe, into zinc oxide. The modified nano zinc oxide can also be prepared by deposition of Ag ions.

It should be noted that the combination of zinc pyrithione and modified nano zinc oxide can further enhance the antibacterial performance, and provide the floor with better durability, which meets the standards of the European Union and Asian countries.

Specifically, zinc pyrithione is an efficient and safe antibacterial chemical, which is widely used in anti-dandruff shampoos and is safe and non-toxic. When used in the surface and back of the floor, zinc pyrithione can effectively inhibit and kill bacteria and molds that grow on the surface and back of the floor of the moist environment. Zinc pyrithione has a good inhibitory and killing effect on a variety of bacteria and fungal molds. It takes $K^+$ and $Mg^{2+}$ out of the bacterial cells and brings $Na^+$ into the bacterial cells to eliminate the ion gradient for bacteria to obtain nutrients, such that the cells finally starve. Different from the bactericidal mechanism of many antimicrobial agents, the zinc pyrithione kills bacteria but without being consumed.

Specifically, nano zinc oxide has strong redox properties, and the electrons $e^-$ and $H^+$ in the valence band of the nano zinc oxide will react with hydroxyl and water adsorbed on the surface of the material to produce hydroxyl, oxygen anion, hydrogen peroxide and other substances. $H^+$ and hydroxyl have strong oxidative activity, which can break the chemical bonds of most organic substances, and therefore, they can decompose the chemical components that make up microorganisms, so as to achieve a sterilization effect. In addition, zinc ions in zinc oxide can react with groups on cell proteins to destroy bacterial cells and their physiological activities. After entering microbial cells, enzymes that destroy the electron transport system react with —SH groups to achieve the sterilization.

In an embodiment, a preparation process shown as follows is adopted. 30-55 parts by weight of formaldehyde with a concentration of 35%-45% and 10-20 parts by weight of distilled water are uniformly mixed, An appropriate amount of a 20-35% sodium hydroxide solution is added to adjust a pH value to 8-9. 3-5 parts by weight of 92%-98% diethylene glycol and 30-45 parts by weight of melamine are added and stirred for 20-30 min, and temperature of the mixture solution is slowly increased to 70-80° C. 1-3 parts by weight of an aldehyde removal agent are added, and sodium hydroxide is added to adjust the pH to 8-8.5. The reaction mixture is heated to 95-100° C. and kept for 60-90 min, and is then cooled to 50-60° C. 0.5-2 parts by weight of zinc pyrithione are added, and the reaction mixture is stirred at 50-60° C. for 20-30 min and cooled to room temperature to obtain the organic antimicrobial impregnating adhesive. 0.5-3 parts by weight of modified nano zinc oxide with a particle size of 100-500 nm are added into the organic antimicrobial impregnating adhesive, and is uniformly mixed.

S2 Impregnation

A wear-resistant paper, a decorative paper and a balance paper are impregnated to obtain an impregnated wear-resistant paper, an impregnated decorative paper and an impregnated balance paper. The wear-resistant paper and the balance paper are impregnated with the composite antibacterial impregnating adhesive. The glue for impregnating the decorative paper is not limited, and can be a commercially-available common impregnating adhesive. Through impregnating papers with the composite antimicrobial impregnating adhesive followed by pressing, the problem that the antimicrobial agent sprayed on the surface of the floor is prone to wear or even fail during the use is solved, and thus the antibacterial durability is improved.

In some embodiments, a preparation process of an impregnated wear-resistant paper, an impregnated decorative paper and an impregnated balance paper includes following steps. A wear-resistant paper, a decorative paper and a balance paper are impregnated in a glue, respectively. The impregnated wear-resistant paper, the impregnated decorative paper and the impregnated balance paper are subjected to pre-curing, so as to obtain impregnated papers with a pre-curing degree of 40-60%. The pre-curing is to add a curing agent to the glue, and is performed at 85-95° C. for 2-5 min. A weight ratio of the curing agent to the glue is (0.1-0.5):100. Specifically, the curing agent is selected from the group consisting of a melamine formaldehyde (MF) curing agent-710, a MF curing agent-740, a MF curing agent-21133 and a combination thereof. Preferably, the curing agent is the MF curing agent-710, and an addition amount of the curing agent is 0.3% by weight of the glue. The pre-curing process can be performed in a drying tunnel in a conventional manner. An impregnating amount of the glue on the wear-resistant paper is 100-240 g/m$^3$; an impregnating amount of the glue on the decorative paper is 100-240 g/m$^3$; and an impregnating amount of the glue on the balance paper is 100-240 g/m$^3$. The wear-resistant paper and the balance paper are impregnated with the composite antibacterial impregnating adhesive provided herein, and the decorative paper is impregnated with a commercially-available impregnating adhesive such as a polyurethane glue.

Further, a weight of the impregnated wear-resistant paper (containing the glue) is 100-160 g/cm$^3$, and a thickness of the impregnated wear-resistant paper is 0.1-0.4 mm. A weight of the impregnated decorative paper (containing the glue) is 120-200 g/cm$^3$, and a thickness of the impregnated decorative paper is 0.1-0.4 mm. A thickness of a substrate is 8-16 mm, and a density of the substrate is 0.5-1.0 g/cm$^3$. A weight of the impregnated balance paper (containing the glue) is 150-300 g/cm$^3$, and a thickness of the impregnated balance paper is 0.2-0.5 mm. The impregnating amount of each layer will affect the final antibacterial performance of the floor. If the impregnating amount is insufficient, the antibacterial performance of the floor cannot be improved due to the decomposition of the organic antimicrobial agent; and if the impregnating amount is excessive, it will increase the production cost.

S3 Hot press forming

The impregnated wear-resistant paper, the impregnated decorative paper, the substrate and the impregnated balance paper laminated subsequently are subjected to hot press forming. The specific process of the hot press forming can adopt the existing process.

In an embodiment, the hot press forming is performed at 190-220° C. and 20-25 MPa for 15-40 s. By further optimizing the temperature, pressure and time of the hot press forming, the antibacterial effect is further enhanced, preventing the organic antimicrobial agent from decomposing due to the high temperature of the hot press forming and preventing the molding effect from being affected by the low temperature of the hot press forming.

An antimicrobial reinforced floor prepared by the above-mentioned method is provided. The antimicrobial reinforced floor has simplified preparation process, and meanwhile, the antimicrobial agents are not easy to damage. The antimicrobial reinforced floor is antifungal as well as antibacterial, and has good durability and high effectiveness.

Additionally, the antimicrobial reinforced floor provided herein has a good inhibitory and killing effect on *Staphylococcus aureus*, *Escherichia coli*, *Candida albicans* and common fungi. According to ISO 22196-2016 *Plastics-Measurement of antibacterial action on plastic surfaces*, the effective killing rates of the floor on *Staphylococcus aureus* and *Escherichia coli* are larger than 99.9%. According to ISO 16869-2008 *Plastics-Assessment of the effectiveness of fungistatic compounds in plastics formulations*, the floor has exhibited Class 1 antibacterial activity against *Aspergillus niger*, *Chaetomium globosum*, *Paecilomyces variabilis*, *Penicillium funiculosum* and *Trichoderma longiflorum*.

The technical solutions and beneficial effects of the present disclosure will be further described below with reference to the embodiments.

Example 1

Preparation of an Antimicrobial Reinforced Floor (1) Preparation of a composite antibacterial impregnating adhesive 35 parts by weight of 40% formaldehyde and 16 parts by weight of distilled water were uniformly mixed. 25% sodium hydroxide solution was added to adjust a pH value of the mixture solution to 8-8.5. 3.6 parts by weight of 98% diethylene glycol and 36 parts by weight of melamine were added and stirred for 25 min. Temperature of the mixture solution was then slowly increased to 70° C. 1.5 parts by weight of ethylene urea were added. The pH value of the mixture solution was adjusted to 8-8.5 with sodium hydroxide. The temperature of the mixture solution was increased to 95° C. and kept for 80 min, and then cooled to 55° C. 1.2 parts by weight of zinc pyrithione were added and stirred at 55° C. for 25 min. The mixture solution cooled to room temperature to obtain an organic antibacterial impregnating adhesive. 1.5 parts by weight of modified nano zinc oxide with a particle size of about 100 nm were added into the organic antibacterial impregnating adhesive and was uniformly mixed.

(2) Preparation of Antibacterial Impregnated Paper

A wear-resistant paper and a balance paper were impregnated with the composite antibacterial impregnating adhesive. A MF curing agent-740 was added, and a weight ratio of the MF curing agent to the composite antibacterial impregnating adhesive was 0.3:100. The impregnated papers passed through a drying tunnel at 85° C. for 3 min to have a pre-curing degree of 55%. An impregnating amount of the composite antimicrobial impregnating adhesive on the wear-resistant paper was 110 g, and an impregnating amount of the composite antimicrobial impregnating adhesive on the balance paper was 160 g. The impregnated wear-resistant paper and impregnated balance paper were cut and kept sealed. A decorative paper was impregnated with a melamine-formaldehyde glue (not containing the composite antimicrobial impregnating adhesive). A MF curing agent-710 was added into the melamine-formaldehyde glue. A weight ratio of the MF curing agent-710 to the melamine-formaldehyde glue was 0.4:100. The impregnated decorative paper passed through a drying tunnel at 85° C. for 3 min to reach a pre-curing degree of 55%.

(3) Preparation of an Antimicrobial Reinforced Floor

The impregnated wear-resistant paper, the impregnated decorative paper, a substrate and the impregnated balance paper were combined from top to bottom and subjected to hot press forming. The impregnated wear-resistant paper had a thickness of 0.15 mm and a weight of 130 g/m$^3$. The impregnated decorative paper had a thickness of 0.25 mm and a weight of 150 g/cm$^3$. The substrate had a thickness of 8 mm and a density of 0.66 g/cm$^3$. The impregnated balance paper had a thickness of 0.3 mm and a weight of 240 g/cm$^3$. The hot press forming was performed at 205° C. and 21 MPa for 20 seconds. After the hot press was completed, the antimicrobial reinforced floor was obtained by cooling.

Example 2

Preparation of an Antimicrobial Reinforced Floor (1) Preparation of a Composite Antibacterial Impregnating Adhesive 37 parts by weight of 38% formaldehyde and 18 parts by weight of distilled water were uniformly mixed. An appropriate amount of a 25% sodium hydroxide solution was added to adjust a pH value of the mixture solution to 8-8.5. 3.5 parts by weight of 96% diethylene glycol and 35 parts by weight of melamine were added and stirred for 20 min. Temperature of the mixture solution was then slowly increased to 80° C. 1.3 parts by weight of ethylene urea were added. The pH value of the mixture solution was adjusted to 8-8.5 with sodium hydroxide. The temperature of the mixture solution was increased to 100° C. and kept for 70 min, and then cooled to 50° C. 1.5 parts by weight of zinc pyrithione were added and stirred for 25 min under heat preservation. The mixture solution cooled to room temperature to obtain an organic antibacterial impregnating adhesive. 1.2 parts by weight of modified nano zinc oxide with a particle size of about 500 nm were added into the organic antimicrobial impregnating adhesive and was uniformly mixed.

(2) Preparation of Antibacterial Impregnated Paper

A wear-resistant paper and a balance paper were impregnated with the composite antibacterial impregnating adhesive. A MF curing agent-740 was added, and a weight ratio of the MF curing agent to the composite antibacterial impregnating adhesive was 0.5:100. The impregnated papers passed through a drying tunnel at 90° C. for 4 min to have a pre-curing degree of 55%. An impregnating amount of the composite antibacterial impregnating adhesive on the wear-resistant paper was 100 g, and an impregnating amount of the composite antibacterial impregnating adhesive on the balance paper was 150 g. The impregnated wear-resistant paper and impregnated balance paper were cut and kept sealed. A decorative paper was impregnated with a melamine-formaldehyde glue (not containing the composite antibacterial impregnating adhesive). A MF curing agent-740 was added into the melamine-formaldehyde glue. A weight ratio of the MF curing agent-740 to the melamine-formaldehyde glue was 0.5:100. The impregnated decorative paper passed through a drying tunnel at 85° C. for 3 min to have a pre-curing degree of 55%.

(3) Preparation of an Antimicrobial Reinforced Floor

The impregnated wear-resistant paper, the impregnated decorative paper, a substrate and the impregnated balance paper were combined from top to bottom and subjected to hot press forming. The impregnated wear-resistant paper had a thickness of 0.15 mm and a weight of 120 g/m$^3$. The impregnated decorative paper had a thickness of 0.25 mm and a weight of 160 g/cm$^3$. The substrate had a thickness of 8 mm and a density of 0.66 g/cm$^3$. The impregnated balance paper had a thickness of 0.3 mm and a weight of 250 g/cm$^3$. The hot press forming was performed at 200° C. and 21 MPa for 25 seconds. After the hot press was completed, the antimicrobial reinforced floor was obtained by cooling.

Example 3

Preparation of an Antimicrobial Reinforced Floor The method provided herein was basically the same as that adopted in Example 1 except that the impregnated wear-resistant paper had a thickness of 0.1 mm and a weight of 100 g/m$^3$. The impregnated decorative paper had a thickness of 0.1 mm and a weight of 120 g/cm$^3$. The substrate had a thickness of 8 mm and a density of 0.5 g/cm$^3$. The impregnated balance paper had a thickness of 0.2 mm and a weight of 150 g/cm$^3$.

Example 4

Preparation of an Antimicrobial Reinforced Floor

The method provided herein was basically the same as that adopted in Example 1 except that the impregnated wear-resistant paper had a thickness of 0.4 mm and a weight of 160 g/m$^3$. The impregnated decorative paper had a thickness of 0.4 mm and a weight of 200 g/cm$^3$. The substrate had a thickness of 16 mm and a density of 1.0 g/cm$^3$. The impregnated balance paper had a thickness of 0.5 mm and a weight of 300 g/cm$^3$.

Example 5

Preparation of an Antimicrobial Reinforced Floor

The method provided herein was basically the same as that adopted in Example 1 except that in this example, the hot press forming was performed at 190° C., 25 MPa for 40 seconds.

Example 6

Preparation of an Antimicrobial Reinforced Floor

The method provided herein was basically the same as that adopted in Example 1 except that in this example, the hot press forming was performed at 220° C. and 20 MPa for 15 seconds.

Test Example 1

The antimicrobial performance of the antimicrobial reinforced floors prepared in Examples 1-6 was tested by conventional methods, and the results showed that the effective killing rate for *Staphylococcus aureus* and *Escheri-*

*chia coli* was greater than 99.9%, and the floors exhibited Class 1 inhibitory activity against *Aspergillus niger, Chaetomium globosum, Paecilomyces variabilis, Penicillium funiculosum* and *Trichoderma longiflorum*.

Comparative Example 1

Preparation of an Antimicrobial Reinforced Floor

The method provided herein was basically the same as that adopted in Example 1 except that in step (1), no organic antimicrobial agent was added, and the inorganic antimicrobial agent was added directly after the reaction was completed and cooled to room temperature.

The results showed that the antibacterial effect could not meet the requirements, and the effective killing rate of *Staphylococcus aureus* and *Escherichia coli* was more than 99%, and the floor only exhibited Class 1 antibacterial activity against *Aspergillus niger, Chaetomium globosum, Paecilomyces variabilis, Penicillium funiculosum* and *Trichoderma longiflorum*.

Comparative Example 2

Preparation method of an Antimicrobial Reinforced Floor

The method provided herein was basically the same as that adopted in Example 1 except that in step (1), no organic antimicrobial agent was added.

The results showed that the antibacterial effect could not meet the requirements, and the effective killing rate of *Staphylococcus aureus* and *Escherichia coli* was more than 98%, and the floor exhibited Class 1 antibacterial activity against *Aspergillus niger, Chaetomium globosum, Paecilomyces variabilis, Penicillium funiculosum* and *Trichoderma longiflorum*.

Described above are merely preferred embodiments of the disclosure, which are not intended to limit the scope of this disclosure. Any changes, replacements and modifications made by those skilled in the art without departing from the spirit of this disclosure should fall within the scope of the present disclosure defined by the appended claims.

What is claimed is:

1. A method for preparing an antimicrobial reinforced floor, the method comprising:
   mixing a raw impregnating adhesive and an organic antimicrobial agent at 50-60° C. for 20-30 min to obtain an organic antimicrobial impregnating adhesive;
   cooling the organic antimicrobial impregnating adhesive to room temperature and mixing the organic antimicrobial impregnating adhesive with an inorganic antimicrobial agent to produce a composite antimicrobial impregnating adhesive;
   impregnating a paper with the composite antimicrobial impregnating adhesive to obtain an impregnated paper, wherein the paper consists of a wear-resistant paper, a decorative paper and a balance paper, and the impregnated paper consists of an impregnated wear-resistant paper, an impregnated decorative paper and an impregnated balance paper; and
   laminating the impregnated wear-resistant paper, the impregnated decorative paper, a substrate and the impregnated balance paper followed by hot press forming.

2. The method of claim 1, wherein the raw impregnating adhesive is prepared through steps of:
   adjusting an aqueous formaldehyde solution to pH 8-9;
   mixing the aqueous formaldehyde solution with melamine followed by reaction in the presence of a stabilizer for 20-30 min to obtain a reaction mixture; and
   adjusting the reaction mixture to pH 8-8.5; and heating the reaction mixture to 95-100° C. followed by reacting for 60-90 min to produce the raw impregnating adhesive.

3. The method of claim 2, wherein the stabilizer is diethylene glycol; and after the reaction of the aqueous formaldehyde solution and the melamine, the reaction mixture is heated to 70-80° C., added with a formaldehyde scavenger and then adjusted to pH 8-8.5.

4. The method of claim 2, wherein a weight ratio of the organic antimicrobial agent to the raw impregnating adhesive is (0.5-3.3):100; and a weight ratio of the inorganic antimicrobial agent to the raw impregnating adhesive is (0.5-5):100.

5. The method of claim 1, wherein the organic antimicrobial agent is selected from the group consisting of a quaternary ammonium salt, a phenolic compound, a biguanide compound, an isothiazole compound, a pyrrole compound, an organometallic compound, an imidazole compound, a pyridine compound and a combination thereof and the inorganic antimicrobial agent is selected from the group consisting of nano silver, nano copper, nano titanium dioxide, nano zinc oxide and a combination thereof.

6. The method of claim 5, wherein the organic antimicrobial agent is a pyridine compound; and the inorganic antimicrobial agent is nano zinc oxide.

7. The method of claim 6, wherein the organic antimicrobial agent is zinc pyrithione; and the inorganic antimicrobial agent is modified nano zinc oxide with a particle size of 100-500 nm.

8. A method for preparing an antimicrobial reinforced floor, the method comprising:
   introducing an organic antimicrobial agent and an inorganic antimicrobial agent into an impregnating adhesive to obtain a composite antimicrobial impregnating adhesive;
   impregnating a paper in the composite antimicrobial impregnating adhesive, respectively, wherein the paper consists of a wear-resistant paper, a decorative paper and a balance paper;
   introducing a curing agent to the composite antimicrobial impregnating adhesive for pre-curing at 85-95° C. for 2-5 min to obtain an impregnated paper to a curing degree of 40-60%, wherein the impregnated paper consists of an impregnated wear-resistant paper, an impregnated decorative paper and an impregnated balance paper; and
   laminating the impregnated wear-resistant paper, the impregnated decorative paper, a substrate and the impregnated balance paper followed by hot press forming
   wherein a weight ratio of the curing agent to the composite antimicrobial impregnating adhesive is (0.1-0.5):100; and
   an impregnating amount of the composite antimicrobial impregnating adhesive on the wear-resistant paper, the decorative paper and the balance paper is 100-240 g/m$^3$.

9. The method of claim 8, wherein the impregnated wear-resistant paper has a weight of 100-160 g/cm$^3$ and a thickness of 0.1-0.4 mm; the impregnated decorative paper has a weight of 120-200 g/cm$^3$ and a thickness of 0.1-0.4 mm; the impregnated balance paper has a weight of 150-300 g/cm$^3$ and a thickness of 0.2-0.5 mm; and the substrate has a thickness of 8-16 mm.

10. The method of claim 1, wherein the hot press forming is performed at 190-220° C. and 20-25 MPa for 15-40 seconds.

11. The method of claim 8, wherein the organic antimicrobial agent is selected from the group consisting of a quaternary ammonium salt, a phenolic compound, a biguanide compound, an isothiazole compound, a pyrrole compound, an organometallic compound, an imidazole compound, a pyridine compound and a combination thereof and the inorganic antimicrobial agent is selected from the group consisting of nano silver, nano copper, nano titanium dioxide, nano zinc oxide and a combination thereof.

12. The method of claim 8, wherein the hot press forming is performed at 190-220° C. and 20-25 MPa for 15-40 seconds.

* * * * *